US008429679B2

(12) United States Patent
Jung et al.

(10) Patent No.: US 8,429,679 B2
(45) Date of Patent: Apr. 23, 2013

(54) METHOD AND SYSTEM FOR HANDLING FRAMEWORK SHUTDOWN IN A NETWORK

(75) Inventors: Dong-Shin Jung, Suwon-si (KR); Joo-Yeol Lee, Seoul (KR); Siddapur Channakeshava Sreekanth, Bangalore (IN); Subramanian Krishnamurthy, Bangalore (IN); Vedula Kiran Bharadwaj, Bangalore (IN)

(73) Assignee: Samsung Electronics Co., Ltd (KR)

( * ) Notice: Subject to any disclaimer, the term of this patent is extended or adjusted under 35 U.S.C. 154(b) by 184 days.

(21) Appl. No.: 12/743,750

(22) PCT Filed: Nov. 19, 2008

(86) PCT No.: PCT/KR2008/006801
§ 371 (c)(1),
(2), (4) Date: May 19, 2010

(87) PCT Pub. No.: WO2009/066924
PCT Pub. Date: May 28, 2009

(65) Prior Publication Data
US 2010/0257542 A1    Oct. 7, 2010

(30) Foreign Application Priority Data

Nov. 21, 2007    (IN) .......................... 2709/CHE/2007

(51) Int. Cl.
*G06F 3/00* (2006.01)
(52) U.S. Cl.
USPC .......................................... 719/328; 719/330

(58) Field of Classification Search ................. 719/318; 713/1, 2
See application file for complete search history.

(56) References Cited

U.S. PATENT DOCUMENTS

| | | | | |
|---|---|---|---|---|
| 6,131,134 | A * | 10/2000 | Huang et al. ................. 710/302 |
| 7,680,935 | B2 * | 3/2010 | Szyperski et al. ............ 709/226 |
| 7,987,489 | B2 * | 7/2011 | Krzyzanowski et al. ....... 725/80 |
| 2002/0149810 | A1 * | 10/2002 | Brown et al. ................. 359/110 |
| 2003/0177281 | A1 * | 9/2003 | McQuillan et al. ........... 709/320 |
| 2004/0044890 | A1 * | 3/2004 | Lim et al. ......................... 713/2 |
| 2007/0291761 | A1 * | 12/2007 | Kauniskangas et al. ... 370/395.2 |

FOREIGN PATENT DOCUMENTS

CN    1460210    12/2003
EP    1 793 565    6/2007

OTHER PUBLICATIONS

Deepak Gupta, A Formal Framework for On-line Software Version Change, Feb. 1996.*

(Continued)

*Primary Examiner* — Lechi Truong
(74) *Attorney, Agent, or Firm* — The Farrell Law Firm, P.C.

(57) ABSTRACT

Method and central server for handling of a framework shutdown in a network is disclosed. The method includes generating an event related to a framework shutdown. The method also includes converting the event as a Universal Plug and Play (UPnP) event. The method further includes delivering the converted event to one or more controllers present in the network. The central server includes a processor configured a processor configured to generate an event related to a framework shutdown and to convert the event as a Universal Plug and Play (UPnP) event. The central serve also includes a transmitter configured to deliver the converted event to one or more controllers present in the network.

11 Claims, 2 Drawing Sheets

OTHER PUBLICATIONS

Costa-Requena et al.: "UPnP Low Power Architecture", XP007911300, Aug. 27, 2007.

Open Services Gateway Initiative: "OSGi Service Platform—Release 3", Chapters 1-4, 10 and 25; XP-002585863, Mar. 1, 2003.

Liang et al., "Bundle Dependency in Open Services Gateway Initiative Framework Initialization", Proceedings of 5th Int'l Workshop on Networked Appliances, Oct. 2002.

Cervantes et al., "Beanome: A Component Model for the OSGi Framework", Workshop on Software Infrastructure for Component-Based Applications on Consumer Devices, Sep. 2000.

* cited by examiner

METHOD AND SYSTEM FOR HANDLING FRAMEWORK SHUTDOWN IN A NETWORK

TECHNICAL FIELD

The present invention relates to the field of managing framework in a network. More specifically, the present invention relates to a method and system for handling shutdown of a framework in a network.

BACKGROUND ART

A framework must be started before any services can be provided in a network. There exist various techniques for starting a framework. According to one such technique, a framework can be started by some command line initiation or by reading startup information from a configuration file. Some events that take place when a framework is started are, handling of events, entering of system bundle in starting state, staring previously stalled bundles, wrapping up an exception that occur during startup, publishing the exception, entering of the system bundle in a start state, and broadcasting a framework event that indicates the framework has started.

There are occasions when a framework needs to be shutdown. Shutdown of a framework can be initiated by stopping the system bundle or a framework can get shutdown abruptly due to some dependency failure. Some examples of dependency failure include power shutdown and battery null. Some events that take place when a framework is shutdown are, entering of system bundle in a stopping state, stopping all active bundles, recording sates of all the active bundles at the shutdown, wrapping exception, publishing the exceptions, and disabling event handling. When a framework is shutdown, a start-level of the framework is decremented to zero. A start-level of zero is a state in which the framework has either not been launched or has completed shutdown (these two states are considered to be equivalent). In this state, no bundles are running. The requested start-level must be set to zero when the Framework shuts down.

For each start-level, the framework implementation can select an appropriate ordering for stopping of bundles in the start-level. This may include stopping bundles in reverse dependency order such that all bundles which depend on a given bundle are shutdown before the given bundle. At any point of time when a framework shuts down, all controllers that are using the framework needs to be informed about the shutdown.

In light of the above discussion, there is a need for handling shutdown of a framework in a network that informs all the controllers that are using the framework about the shutdown of the framework.

DISCLOSURE OF INVENTION

Technical Solution

In an embodiment, a method for handling shutdown of a framework in a network is provided. The method includes generating an event related to a framework shutdown. The method also includes converting the event as a Universal Plug and Play (UPnP) event. Further, the method includes delivering the converted event to one or more controllers present in the network. In an embodiment, the method also includes decrementing the start-level of framework to zero during the framework shutdown. In another embodiment, the method includes determining whether the shutdown is abrupt. In this embodiment, the method also includes receiving by the framework a poll from an entity external to the framework at a regular interval of time and informing the controllers of the abrupt shutdown. In an embodiment, the framework is an Open Service Gateway initiative framework and the event is of type FrameworkEvent.SHUTDOWN.

In another embodiment, central server is provided. The central server includes a processor configured to generate an event related to a framework shutdown and to convert the event as a Universal Plug and Play (UPnP) event. The central server also includes a transmitter configured to deliver the converted event to one or more controllers present in the network. In an embodiment, the central server also includes a receiver configured to receive a poll from an entity external to the framework at a regular interval of time. The one or more controllers in the network are informed about an abrupt shutdown based on the poll. In an embodiment, the framework is an Open Service Gateway initiative framework and the event is of type Frame-workEvent.SHUTDOWN.

The features and advantages of the present invention will become more apparent from the ensuing detailed description of the invention taken in conjunction with the accompanying drawings.

MODE FOR THE INVENTION

The terms used to describe various embodiments are exemplary. It should be understood that these are provided to merely aid the understanding of the description, and that their use and definitions in no way limit the scope of the invention.

Figure 1:
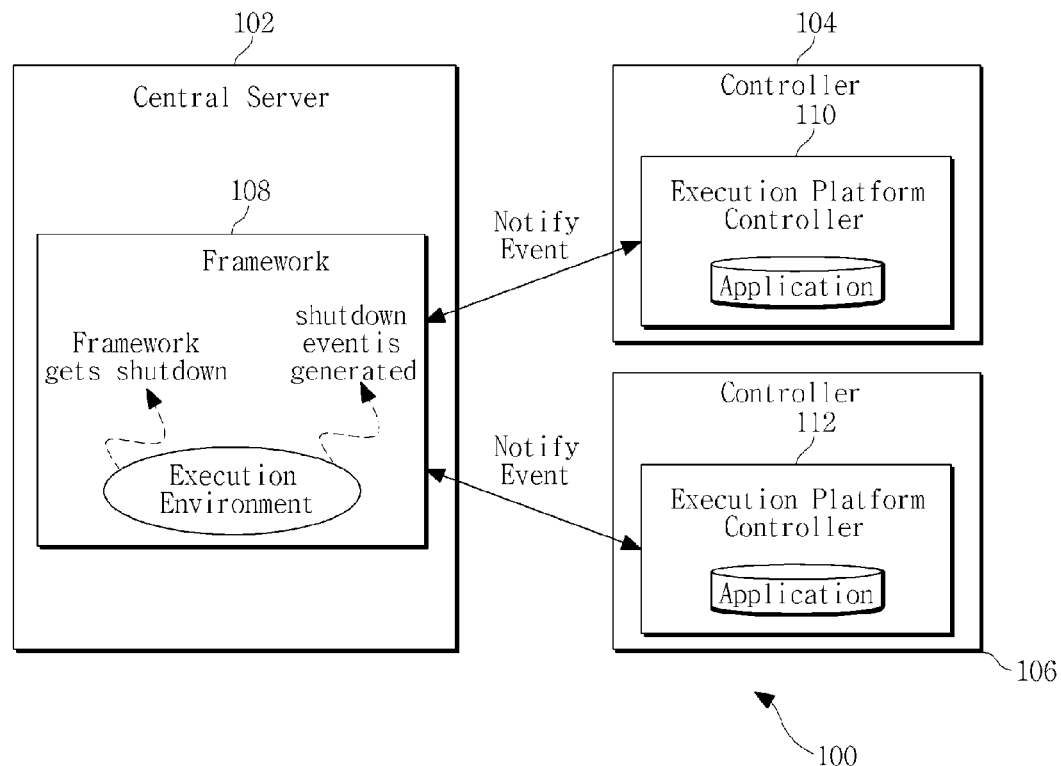
FIG. 1 illustrates a network where various embodiments of the present invention can be practiced.

FIG. 1 illustrates a network 100, where various embodiments of the present invention can be practiced. The network 100 can include a central server and one or more controllers. Examples of the network 100 include, but are not limited to, a Local Area Network (LAN) and Wireless Local Area Network (WLAN). For the purpose of this description, the network 100 is shown to include a central server 102, a controller 104, and a controller 106. Examples of a central server and controllers include, but are not limited to, mobile phones, laptops, personal computers, personal digital assistants, printers, access points, televisions, media players, internet gateway devices. This embodiment will be explained with the help of the central server 102 and the controllers 104 and 106. However, it will be apparent to a person ordinarily skilled in the art that the present embodiment can be implemented by using any other central server and controllers in the network 100.

The central server 102 is shown to include a framework 108. The framework 108 provides execution environment to application or services registered with the framework 108. The framework 108 provides these services to other devices, the controllers 104 and 106 in the network 100. The framework 108 can get shutdown or restarted once optional extension bundles for system bundles are refreshed or updated. The framework 108 must be re-launched when the extension bundles are updated. The framework 108 can also get shutdown abruptly due to some dependency failure. As the framework 108 provides services registered with it to other devices (controllers), devices in the network 100 must be informed about the shutdown of the framework 108. The central server 102 notifies the shutdown of the framework 108 to the controllers 104 and 106 connected to it. An execution platform 110 in the controller 104 and an execution platform 112 in the controller 106 are informed about the shutdown of the framework 108 in the central server 102. Functionalities of the central server 102 is explained with help of FIG. 2.

Figure 2:
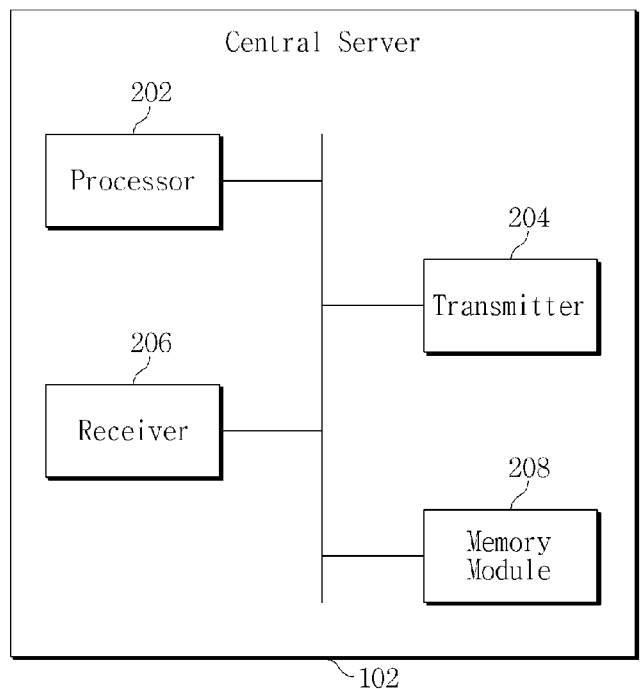
FIG. 2 illustrates a central server, in accordance with one embodiment of the present invention.

FIG. 2 illustrates the central server 102, in accordance with one embodiment of the present invention. To explain this embodiment, references will be made to FIG. 1. However, it will be apparent to a person ordinarily skilled in the art that the present embodiment can be explained/practiced by using any other embodiment of the present invention. In this embodiment, the central server 102 is capable of informing a framework shutdown to other devices/controllers in the network 100. An example of the framework includes, but is not limited to, an Open Services Gateway initiative (OSGi) framework. The central server 102 includes a processor 202 and a transmitter 204. The processor 202 is configured to generate an event related to a framework shutdown. An example of the event includes, but is not limited to, FrameworkEvent.SHUTDOWN. The processor 202 also converts the event as a Universal Plug and Play (UPnP) event. The processor 202 then provides the converted event to the transmitter 204.

The transmitter 204 delivers the converted event to one or more controllers present in the network 100. For example, the transmitter 204 can deliver the converted event to the controllers 104 and 106 that are connected to the central server 102. In an embodiment, the framework shutdown is abrupt. In this embodiment, the central server 102 also includes a receiver 206 to receive poll from an entity external to the framework at regular interval of time. The external entity receives an acknowledgement from the framework in response to the poll. If the external entity does not receive the acknowledgement from the framework, the framework is determined to be shutdown. This helps the central server 102 to inform the controllers 104 and 106 in the network 100 about the abrupt shutdown of the framework. The transmitter 204 and the receiver 206 can be integrated as a transceiver.

In an embodiment, the processor 202 is also configured to stop a system bundle and a plurality of active bundles to prepare the framework 108 for a normal shutdown. In other words, the framework is shutdown when the system bundle and the plurality of active bundles are stopped. The central server 102 can also include a memory module 208. The memory module 208 stores state of each of the plurality of active bundles at the shutdown. The state indicates a state of the bundle from where each bundle must be restarted when the framework 108 is restarted. The process of handling shutdown of a framework is explained with the help of FIG. 3 and FIG. 4.

Figure 3:
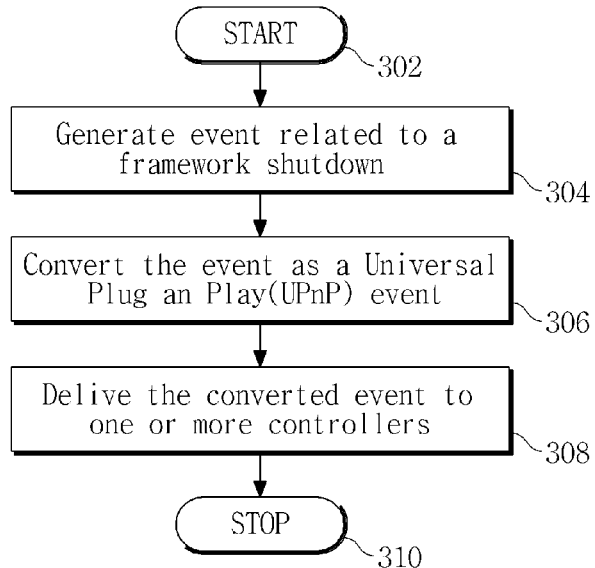
FIG. 3 illustrates a flow chart depicting a method for handling shutdown of a framework the network, in accordance with one embodiment of the present invention.

FIG. 3 illustrates a flowchart depicting a method 300 for handling framework of a shutdown in the network 100, in accordance with an embodiment of the present invention. To explain the method 300, references will be made to FIG. 1 and FIG. 2. However, it will be apparent to a person ordinarily skilled in the art that the present embodiment can be explained with the help of any other suitable embodiment of the present invention. Further, the method 300 can also include more number of steps as depicted in FIG. 3. At step 302, the method 300 is initiated. At step 304, an event related to a framework shutdown is generated by the processor 202. Examples of some mechanism for generating event are Call-Back mechanism and Listener-Notify mechanism. The framework can be an OSGi framework and the event can be a FrameEvent.SHUTDOWN. At step 306, the event is converted as a UPnP event by the processor 202. The event is converted to the UPnP event, as the controllers 104 and 106 present in the network 100 may be UPnP controllers. Conversion of the event enables the controllers (UPnP) in the network 100 to interpret the event.

At step 308, the converted event is delivered to one or more controllers, for example, the controllers 104 and 106 in the network 100. The event related to a framework shutdown enables the controllers 104 and 106 to have information about the framework shutdown. The controllers 104 and 106 can use this information and stop sending network messages to the framework, as the framework is shutdown and will not be able to respond to these network messages. Further, the controllers can start researching other devices for an alternative framework. The framework shutdown can either be normal shutdown or an abrupt shutdown. For the abrupt framework shutdown a poll is received from an entity external to the framework at a regular interval of time. The controllers are then informed about the abrupt shutdown based on the poll. Thereafter, the method 300 is terminated at step 310. The method for handling of a framework shutdown is explained in detail with the help of FIG. 4.

Figure 4:
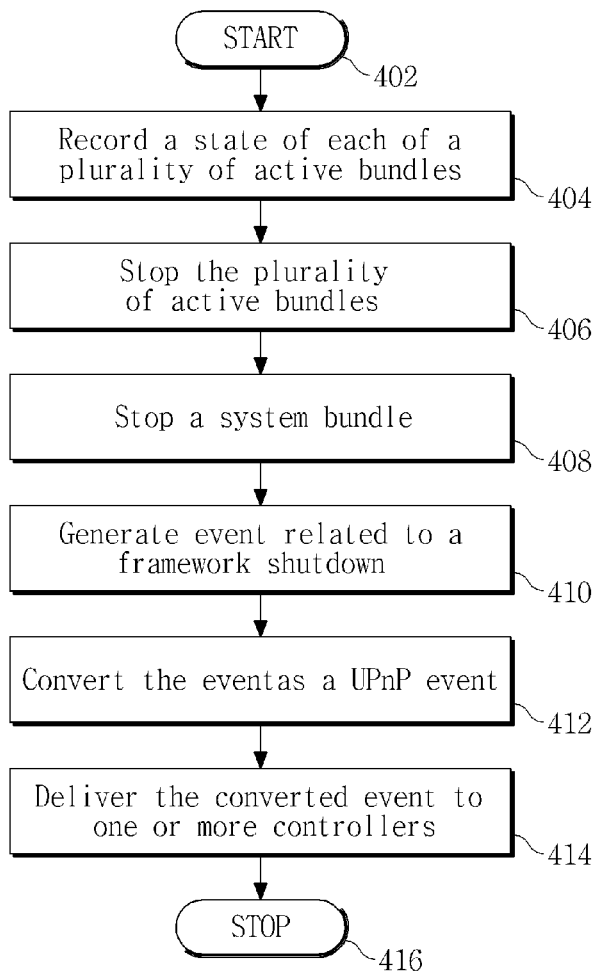
FIG. 4 illustrates a flow chart depicting a method for handling shutdown of a framework the network, in accordance with another embodiment of the present invention.

FIG. 4 illustrates a flowchart depicting a method 400 for handling of a framework shutdown in the network 100, in accordance with another embodiment of the present invention. To explain the method 400 references will be made to FIG. 1 and FIG. 2. However, it will be apparent to a person ordinarily skilled in the art that this embodiment can be described by using any other suitable embodiments of the present invention. At step 402, the method 400 is initiated. At step 404, a state of each bundle of a plurality of active bundles is recorded at a framework shutdown. The state of each bundle indicates a point from where each bundle of the plurality of bundle must be restarted. This helps a bundle to re-start from the same state (a state at which the bundle was during the shutdown), when the framework is re-started. The framework 108 can be shutdown by decrementing a start-level of the framework 108 to zero. At step 406, the plurality of active bundles are stopped. The plurality of active bundles can be stopped in a reverse dependency order. To explain reverse dependency order, consider an example in which a bundle A is dependent on a bundle B, and the bundle B is dependent on a bundle C. In this example, the bundle A is shutdown before the bundle B; and the bundles A and B are shutdown (A shuts down before B) before the bundle C. At step 408, a system bundle is stopped. At step 410, an event related to a framework shutdown is generated. At step 412, the event is converted as a UPnP event. At step 414, the converted event is delivered to one or more controllers in the network 100.

In an embodiment, the method 400 also includes wrapping an exception in a Bundle-Exception that occurs during the framework shutdown. Examples of exception include, but are not limited to, illegal arguments exception, out of memory exception, and input/output exception. In this embodiment, the BundleException is published as a framework event of type FrameworkEvent.Error. Thereafter, the method 400 is terminated at step 416.

Various embodiments of the present invention as described above provide the following advantages. The present invention provides a technique by which controllers get information about framework shutdown in a network. Further, the present invention provides proper handling of normal framework shutdown and abrupt framework shutdown. The present invention also provides ease of handling framework shutdown scenarios by using framework eventing mechanism, for example, a Call-Back mechanism and a Listener-Notify mechanism. The present invention also enables the controller to stop sending unnecessary messages to a framework, used by the controller, which is shutdown. Further, the present invention helps the controllers to research for an alternative framework when a framework the controller is using is shutdown.

While the embodiments of the present invention have been illustrated and described, it will be clear that the present invention and its advantages are not limited to these embodiments only. Numerous modifications, changes, variations, substitutions and equivalents will be apparent to those skilled in the art without departing from the spirit and scope of the present invention as described in the claims.

The invention claimed is:

1. A method for handling shutdown of a framework in a network, the method comprising:
   if an event is generated, determining whether the event is related to one of an abrupt framework shutdown and a normal framework shutdown;
   if the event is related to one of the abrupt framework shutdown and the normal framework shutdown, converting the event as a Universal Plug and Play (UPnP) event, and
   delivering the converted event to one or more controllers present in the network; and when the framework shutdown is determined to be the abrupt framework shutdown:
   receiving by the framework a poll from an entity external to the framework at a regular interval of time, and
   informing the one or more controllers of the abrupt shutdown,
   wherein an exception that occurs during the framework shutdown is wrapped in a BundleException that is published as a framework event of type Frame-workEvent.Error.

2. The method of claim 1, further comprising decrementing a start-level of the framework to zero during the framework shutdown.

3. The method of claim 1, further comprising:
   stopping a system bundle; and
   stopping a plurality of active bundles.

4. The method of claim 3, further comprising recording a state of each of the plurality of active bundles at the shutdown, the state of each of the plurality of bundles indicates restarting point of each of the plurality of bundles when the framework is restarted.

5. The method of claim 3, wherein the stopping of the plurality of active bundles comprises shutting down the plurality of active bundles in a reverse dependency order.

6. The method of claim 1, wherein the framework is an Open Service Gateway initiative framework and the event is of type FrameworkEvent.SHUTDOWN.

7. A central server comprising:
   a processor configured to generate an event related to a framework shutdown, to determine, when the event is generated, whether the event is related to one of an abrupt framework shutdown and a normal framework shutdown, and when the event is related to one of the abrupt framework shutdown and the normal framework shutdown, to convert the event as a Universal Plug and Play (UPnP) event;
   a transmitter configured to deliver the converted event to one or more controllers present in a network; and
   a receiver configured to receive a poll from an entity external to the framework at a regular interval of time, when the framework shutdown is determined to be the abrupt framework shutdown,
   wherein the one or more controllers in the network are informed about an abrupt shutdown based on the poll, and
   wherein an exception that occurs during the framework shutdown is wrapped in a BundleException that is published as a framework event of type Frame-workEvent.Error.

8. The central server of claim 7, wherein the transmitter and the receiver are integrated as a transceiver.

9. The central server of claim 7, wherein the processor is further configured to:
   stop a system bundle; and
   stop a plurality of active bundles.

10. The central server of claim 7, further comprising a memory module for storing a state of each of the plurality of active bundles at the shutdown, the state of each of the plurality of active bundles indicates restarting point of each of the plurality of bundles when the framework is restarted.

11. The central server of claim 7, wherein the framework is an Open Service Gateway initiative framework and the event is of type Frame-workEvent.SHUTDOWN.

* * * * *